United States Patent [19]
Chowdhury

[11] Patent Number: 5,685,350
[45] Date of Patent: Nov. 11, 1997

[54] METHOD AND APPARATUS FOR TRANSPORTING, STORING AND DELIVERING DANGEROUS CHEMICALS

[75] Inventor: Naser Mahmud Chowdhury, Orefield, Pa.

[73] Assignee: Air Products and Chemicals, Inc., Allentown, Pa.

[21] Appl. No.: 597,770

[22] Filed: Feb. 7, 1996

[51] Int. Cl.⁶ ..................................................... B65B 1/04
[52] U.S. Cl. .............................. 141/231; 141/99; 410/42; 280/837; 220/DIG. 24; 137/258; 137/267
[58] Field of Search ................................. 141/231, 99, 98, 141/65, 236; 410/36, 42; 280/837, 838; 220/562, DIG. 24; 137/899, 259, 265, 266, 267; 128/202.13, 203.26, 205.24, 204.18, 201.27, 201.28

[56] References Cited

U.S. PATENT DOCUMENTS

| | | | |
|---|---|---|---|
| 2,761,397 | 9/1956 | Holst | 280/837 |
| 3,400,732 | 9/1968 | Larrabee | 137/899 |
| 3,479,043 | 11/1969 | Piehl | 410/42 |
| 4,501,270 | 2/1985 | Ulinskas | 128/202.13 |
| 4,542,774 | 9/1985 | Stavlo | 141/231 |
| 4,784,399 | 11/1988 | Finn | 280/5 |
| 5,040,933 | 8/1991 | Lee et al. | 410/42 |
| 5,253,682 | 10/1993 | Haskett et al. | 141/231 |

Primary Examiner—Henry J. Recla
Assistant Examiner—Steven O. Douglas
Attorney, Agent, or Firm—Geoffrey L. Chase

[57] ABSTRACT

Method and apparatus for transporting, storing and delivering dangerous chemicals in a high pressure stacked tube array configuration. Tubes are divided into sub-groups with outside tubes containing inert gases and inside tubes containing chemicals. Inside and outside tubes in each sub-group are manifolded to permit off loading of dangerous chemicals into outside tubes in the event of a leak in an inside tube or tubes in the sub-group. The apparatus includes a manifold system for segregation of source chemicals to provide two independent outlets.

11 Claims, 5 Drawing Sheets

METHOD AND APPARATUS FOR TRANSPORTING, STORING AND DELIVERING DANGEROUS CHEMICALS

TECHNICAL FIELD OF THE INVENTION

The present invention pertains to the use of elongated, high pressure tubes to store, transport and dispense chemicals, e.g., gases under pressure. Such elongated cylinders can be arrayed in rows stacked one upon the other and placed on a trailer, for transportation of gases and other chemicals as is well known in the industrial gas business, e.g., oxygen, hydrogen, nitrogen, etc.

BACKGROUND OF THE INVENTION

In many industrial processes, there is a need to have large quantities of gases or chemicals delivered to a processing facility. One method of delivering gaseous chemicals under pressure is by using the high pressure tube trailer wherein a plurality of tubes are mounted on a trailer which can be pulled by a conventional over-the-road tractor or cab and the trailer left at the customer's facility. Such tube trailers are shown in U.S. Pat. Nos. 4,784,399 and 5,040,933. The tube trailers are generally used to supply chemicals in gaseous or liquid form under high pressure, e.g., above one thousand psig.

In the manufacture of semiconductor devices, bulk quantities of pyrophoric and hazardous chemicals, such as Silane ($SiH_4$) are required. In a conventional operation, Silane is delivered in cylinders containing up to 14 kgm of Silane. As the size and production capacity of semiconductor fabrication houses (fabs) continue to grow, the need for supplying hazardous chemicals in larger containers continue to be a challenge facing the semiconductor industry. As the features and geometry of semiconductor devices continue to get smaller, the need for further on-site purification of the chemicals, such as Silane, used in the manufacturing processes, is essential. Longer production runs and reliability are an industry requirement due to the high costs associated with lost production (wafer scrap). A typical Silane dispensing system used in the semiconductor industry consists of gas cabinets or rack systems containing one or two silane cylinders per tool. In order to increase production, which requires greater volume of a chemical such as Silane, manufacturers have resorted to adding more gas cabinets and more cylinders which create problems in maintaining a safe operation due to frequent cylinder changes, the possibility of component failures in the dispensing systems and the maintenance of product purity.

SUMMARY OF THE INVENTION

According to the present invention, pyrophoric and hazardous or dangerous chemicals can be packaged in banks of elongated cylinders, e.g., 40 foot long tubes, 22 inches in diameter which are assembled in rows stacked one upon the other and placed upon a trailer for delivery to a customer (fab) location. The tubes are assembled so that the stacked array results in outer tubes on either side of inner tubes with a group of outer tubes and inner tubes making up a sub-assembly, each sub-assembly being manifolded so that the tubes can communicate with one another. For each sub-assembly, the outer tubes can be filled with an inert gas at low pressure and the inner tubes filled with the hazardous or dangerous chemical at high pressure. Should a leak develop in the inner tubes, the dangerous chemical can be off-loaded into the tubes containing the inert gas. All of the tubes containing dangerous or hazardous chemicals can be manifolded on one end of the array of tubes to provide continuous delivery of the chemical at the customer's site.

DETAILED DESCRIPTION OF THE INVENTION

Figure 1:
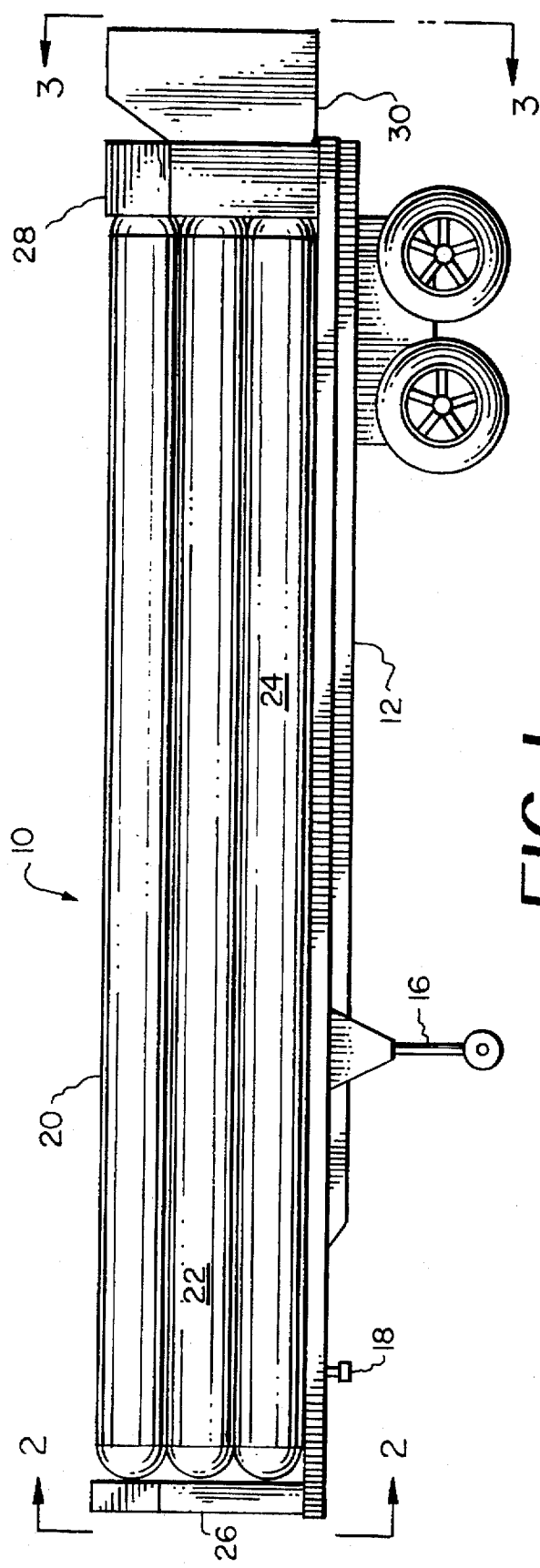
FIG. 1 is a side elevational view of a tube trailer according to the present invention.

Referring to FIG. 1, a tube trailer 10 includes a trailer body 12, wheel assembly 14, trailer stand 16, and a fifth wheel hitch 18, as is well known in the art.

Disposed on the trailer 10 is a plurality of high-pressure tubes or cylinders 20, 22, 24 which are supported on a first end in a frame 26 and on a second end 28 in a similar shaped frame. The ends 26 and 28 can be closed by non-confining doors such as 30 shown in conjunction with end 28, a structure known to a worker skilled in the art.

Figure 2:
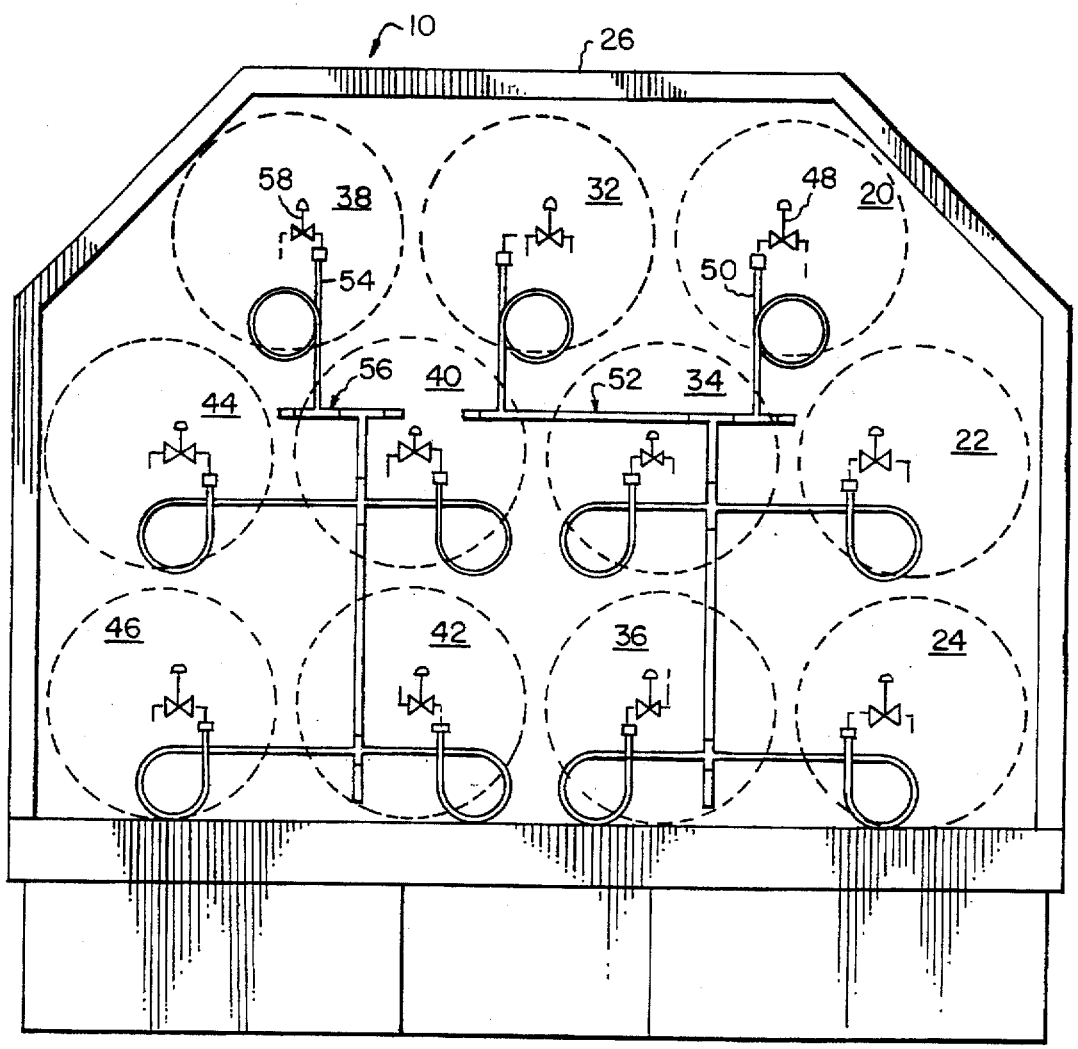
FIG. 2 is an enlarged view taken along line 2—2 of FIG. 1.

Referring to FIG. 2, the first end 26 of the tube trailer 10 shows three rows of tubes wherein two rows (tubes 24, 36, 42, 46 and 22, 34, 40 and 44) are disposed one on top of the other and a third row (tubes 20, 32, and 38) are in a nested configuration on top of the second row. The assembly of tubes positioned in accord with FIG. 2 are referred to as a stacked array or a stacked vertical array. The tubes are divided into two sub-groups, assemblies or banks which are manifolded together. For illustrative purpose only, the groups or banks in FIG. 2 are tubes 38, 40, 42, 44 and 46 which define one sub-group (bank) and tubes 20, 22, 24, 32, 34 and 36 which define a second sub-group (bank). Each tube has a tube isolation valve, such as valve 48 that is shown on tube 20. Each tube has a manifold conduit 50 which in turn is connected to a manifold system 52 as shown in the drawing in connection with the second group of tubes. The first group of tubes contains similar manifold conduits 54 connected to a manifold 56. Again each tube has a tube isolation valve such as valve 58 shown in conjunction with tube 38.

Figure 3:
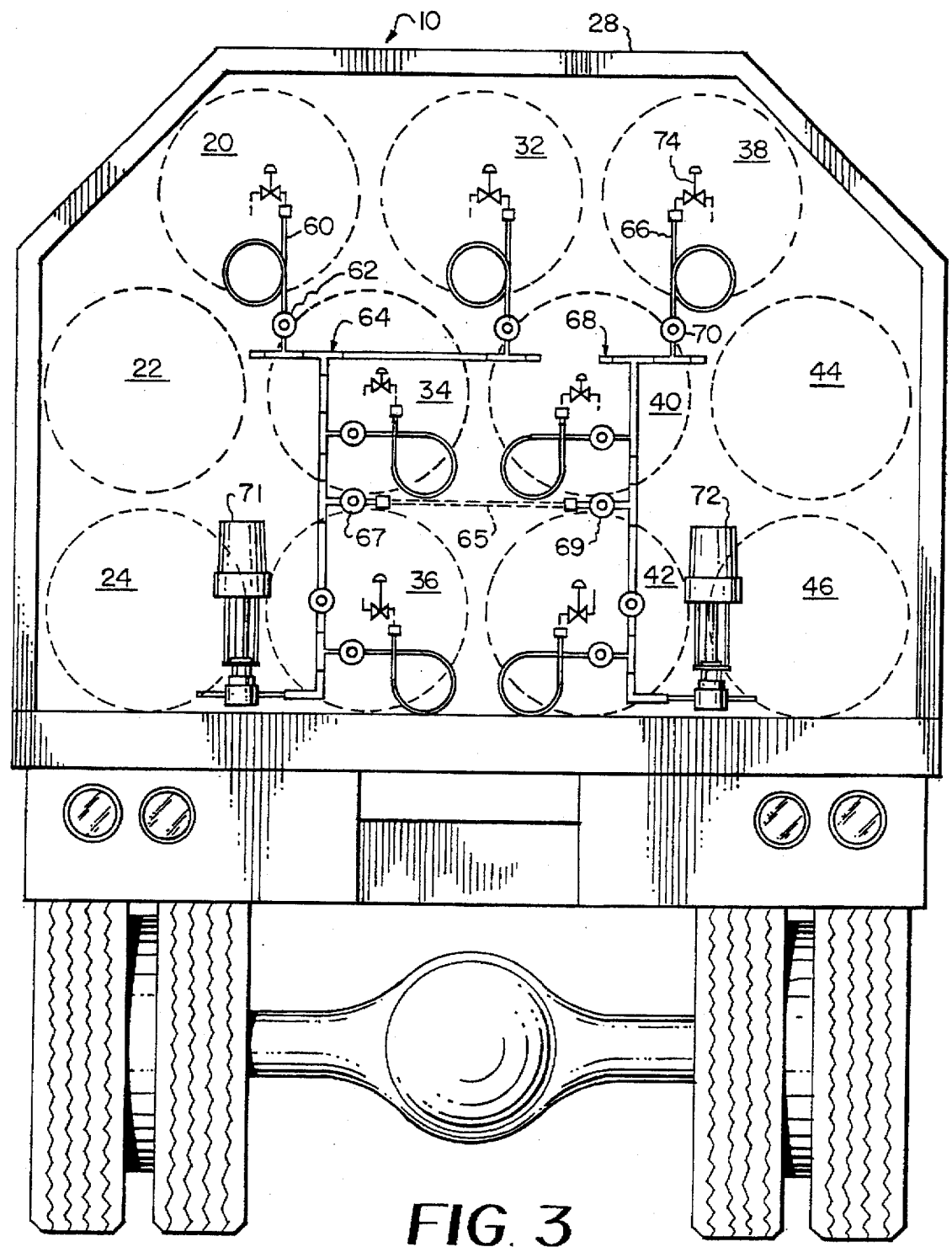
FIG. 3 is an enlarged view taken along line 3—3 of FIG. 1.

FIG. 3 shows the second end 28 of the trailer 10 wherein the tubes 20, 32, 34 and 36 are manifolded in a first group or bank of product tubes and the tubes 38, 40 and 42 are manifolded into a second group or bank of product tubes. The first group of product tubes each contains a manifold conduit such as 60 shown in conjunction with tube 20 and a manifold isolation valve 62 leading to a manifold system 64 which in turn leads to a product delivery valve 71. The second group or bank of product tubes 38, 40, 42 each has a manifold conduit such as 66 shown in conjunction with tube 38, a manifold system 68, a manifold isolation valve 70 and a product delivery valve 72. Manifold systems 64 and 68 then communicate with each other via common conduit 65 and manifold isolation valves 67, 69. Common conduit 65 is a spool piece typically not connected to either manifold unless product transfer from one manifold to the other is required. Each of the tubes for containing hazardous chemicals to be delivered contains a tube isolation valve such as shown as 74 in conjunction with tube 38 so that the flow to the manifold system from the individual tubes can be controlled.

It is well known in the art that at the time a newly constructed tube trailer is put into service for the first time and each time a tube trailer is returned for refilling all of the tubes are purged and filled with dry nitrogen gas under pressure to inert and dry the tubes. In the case of the present invention each blank of tubes 20, 22, 24, 32, 34, 36 and 38, 40, 42, 44, 46 can be dried and inerted by connecting a source of dry nitrogen under pressure to product delivery valves 71 and 72. At the same time all manifold isolation valves, e.g. valve 62, all tube isolation valves e.g. 74, on the back end of the trailer (FIG. 3) and all isolation valves e.g. 48 and 58 on the front end of the trailer (FIG. 2) are opened.

According to the present invention, hazardous chemicals, e.g., Silane, to be delivered to a fab can be introduced into product tubes (inside tubes) 20, 32, 34, 36, 38, 40 and 42 through conventional filling devices through the dispensing (product delivery) valves 71 and 72 and the associated manifolds. When the inside tubes are charged with chemicals, all of the valves shown in conjunction with each tube in FIG. 3 are closed.

Then tubes (outside tubes) 22, 24, 44 and 46 filled with an inert gas, e.g., nitrogen, under lower pressure are a safety measure should the trailer be subject to an accident where there would be a side impact or overturning of the trailer. In the event of side impact, the outside tubes 22, 24, 44 and 46 would absorb the most damage and would be subject to failure releasing harmless inert gas into the surrounding atmosphere.

In the event that the tube trailer has been delivered to a customer's location and a leak would develop in one of the product tubes 20, 32, 34, 36, 38, 40, 42, (e.g., tube 20), isolation valve 48 (FIG. 2) on the first end 26 of the trailer 10 can be opened as well as the isolation valve for tubes 22 and/or 24 (FIG. 1, FIG. 2) so that the hazardous chemical can be transferred from tube 20 into tube 22 and/or 24. For example, in the transportation and storage of Silane, the inside (product) tubes would be charged with Silane under a pressure of approximately 1600 psig. The outside tubes containing the inert gas would be charged with nitrogen at a pressure of approximately 100 psig.

Figure 4:
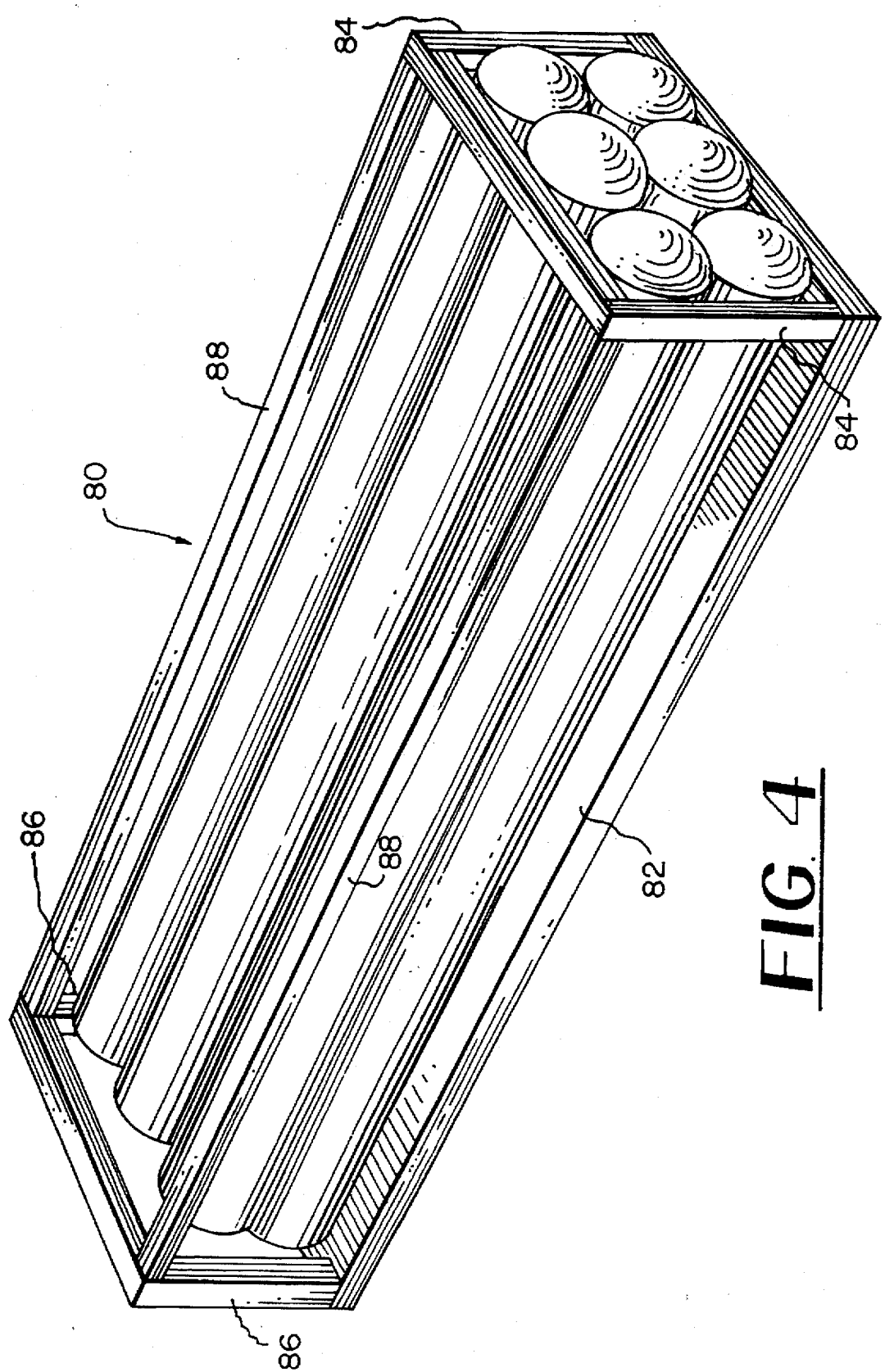
FIG. 4 is a perspective view of an alternate embodiment of the present invention.

As shown in FIG. 4, two or more rows of tubes can be placed inside of a structural frame to achieve what is called ISO (International Shipping Organization) container. Such a device, shown generally as 80 in FIG. 4, includes the outside structural frame members comprising a bottom 82, sides 84, 86 and a top frame or rails 88. Such ISO containers are adapted to be lifted by devices such as cranes or forklift trucks for placement on a rail car, flatbed trailer, into a cargo airplane, or on a container ship for transport anywhere in the world. The tubes and manifolding of the device of FIG. 4 are similar to the tubes of FIGS. 1–3, except the overall length is generally 20 feet instead of 40 feet for the tubes.

Each tube, according to the present invention, will be equipped with a pair of fused metal backed rupture disks, one on the front end of each tube and the other on the second or rear end. The rupture disk assemblies on the front of the tubes will be of the recessed type in order to prevent failure of the relief device in the event of a trailer roll over.

Tubes can be fabricated in accord with Department of Transportation specifications.

According to the method and apparatus of the present invention, safe transportation, storage and dispensing of a dangerous or pyrophoric gas such as Silane is permitted.

Using only seven of the tubes to store and transport the Silane permits the four outermost tubes (two on each side) to be filled with inert gas such as Nitrogen to protect the product tubes in the event of a side impact or roll-over of the trailer. When the trailer is delivered to the customer site, connections are made to deliver the product via a pressure controlled filter manifold (PCFM) installed on the pad where the trailer is parked. From the trailer pad, preferably at a suitable distance from the use point, the Silane gas can flow through stainless steel piping inside the building, in the sub-fab area, a Valve Manifold Box (VMB) can be installed to split the inlet gas into multiple streams feeding multiple fabrication tools.

According to the present invention, the needs of the industry can be satisfied because bulk delivery of pyrophoric and hazardous chemicals can be made to meet industry demands for higher volume. With the method and apparatus of the present invention, there is an added measure of safety because the number of cylinders and frequent cylinder changes of hazardous chemicals is reduced. The delivery of chemicals in larger containers (e.g. tubes) provides increased product purity and consistency of purity. For example, Silane gas supplied in bulk quantities to large fabs will eliminate the handling operation and maintenance of numerous cylinders in gas cabinets or rack systems. Such a system will minimize the number of components (e.g., valves, regulators, instruments, fittings, etc.) reduce equipment cost and product cost, as well as reducing operating labor costs.

Lastly, the time of actual production and the reliability of production can be increased because of the larger quantity of chemical being available in an uninterrupted flow. The tube trailer design (e.g. 4 empty tubes) will permit operators to transfer product from a leaking $SiH_4$ tube to one or more empty tubes, minimizing the release quantity and the extent of damages from a fire caused by the leak. The tube trailer design will also improve uptime to the end user. The manifold design having two independent outlets (supply & reserve sides) will allow two independent flow trains from the tube trailer gas pad to the fab. Using the probability theory (Markov property) it can be shown that the dual train system significantly reduces the probability of a fab shut-down.

Figure 5:
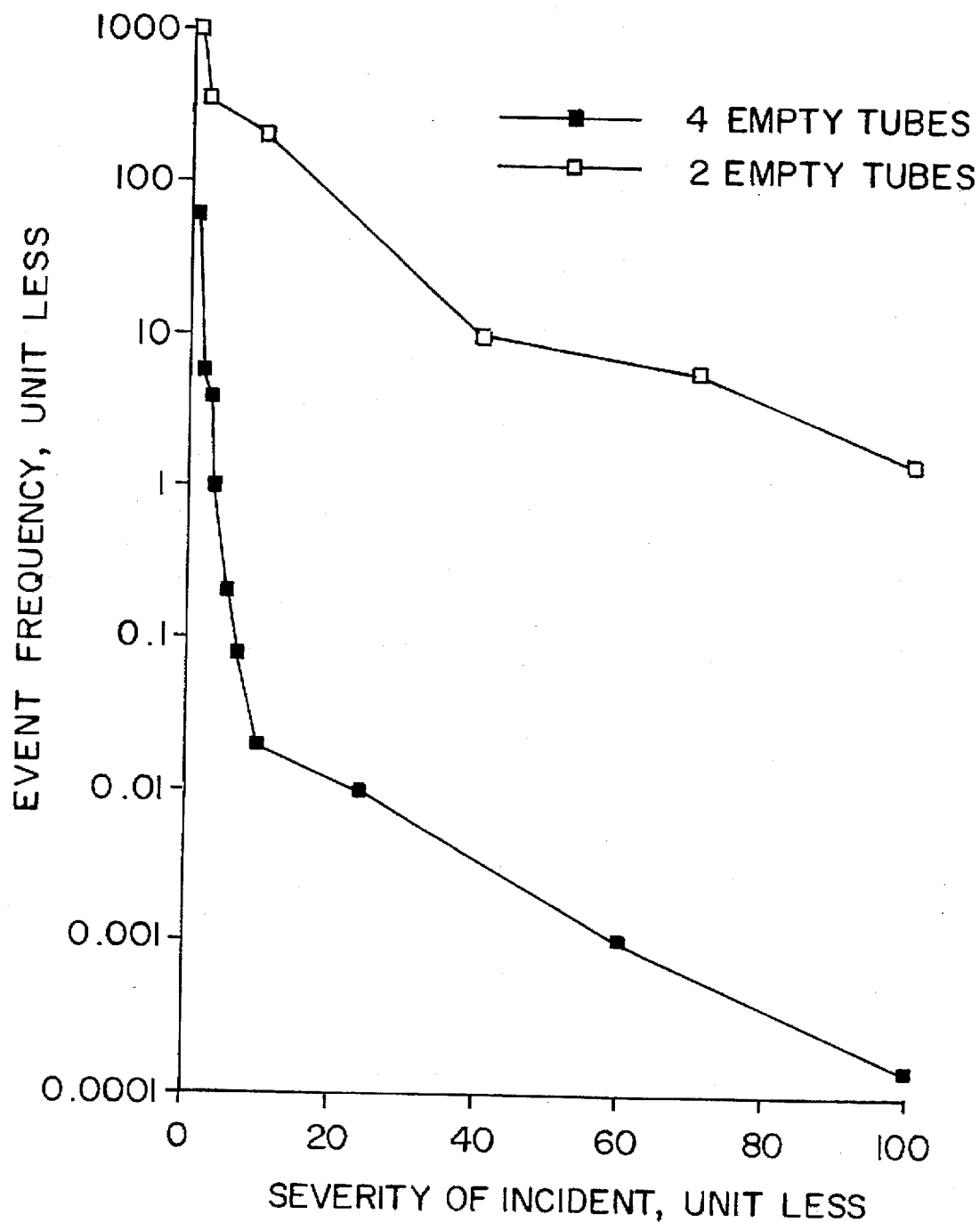
FIG. 5 is a plot of severity of incident against event frequency illustrating transportation risk determined from a model based on industry data.

Tube trailer designs according to the present invention will improve transportation safety for materials such as Silane. FIG. 5 shows the relative safety risk using a single empty tube on each side of a trailer as opposed to using two empty tubes on each side of the trailer. This model was developed quantitatively by using industry tube trailer fleet data and the consequences of releasing product due to impact with other vehicles. The data plotted in FIG. 5 show a significant safety enhancement in transporting dangerous chemicals using the method and apparatus of the present invention.

Having thus described my invention what is desired to be secured by Letters Patent of the United States is set forth in the appended claims.

What is claimed:

1. A method for transporting, storing and dispensing dangerous chemicals utilizing high pressure tubes disposed in a stacked vertical array comprising the steps of:

segregating the tubes into at least two separate banks, each bank consisting of outside tubes and adjacent inside tubes;

establishing valved flow communication only between the outside tubes and the adjacent inside tubes in a bank;

filling said outside tubes in each bank with an inert gas, and filling said inside tubes in said banks with said dangerous chemical.

2. A method according to claim 1 including establishing said vertical array on an over the road trailer.

3. A method according to claim 1 including establishing said vertical array inside a frame-like structure for containerized shipping.

4. A method according to claim 1 including filling said outside tubes of said banks with an inert gas under pressure said pressure being lower than that of the pressure in the inside tubes containing dangerous chemicals.

5. An apparatus for storing dangerous chemicals comprising in combination:

at least two rows of generally elongated high pressure chemical storage tubes having a first end and a second end disposed in a stacked array;

manifold means on said first end of said array to connect outside tubes on each side of said array with adjacent inside tubes in said array to divide said array into at least two separate interconnected banks containing adjacent outside and inside tubes wherein said dangerous chemicals are stored in said inside tubes; said manifold means so constructed and arranged to permit movement of stored fluids between said inside and outside tubes on said first end of said array and product delivery means on said second end of said array to permit removal of stored dangerous chemicals only from said second end of said array.

6. An apparatus according to claim 5 including means to introduce an inert gas into said tubes disposed outwardly in said array.

7. An apparatus according to claim 5 including successive rows of tubes for storing dangerous chemicals arrayed in a nested configuration on top of a top row of tubes contained in said array containing separate interconnected subgroups.

8. An apparatus according to claim 5 wherein said product delivery means includes manifold connection of all tubes used to contain dangerous chemicals.

9. An apparatus according to claim 5 including means to include said stacked array of tubes in an over the road trailer.

10. An apparatus according to claim 5 including rigid frame means to contain said stacked array of tubes for shipment by air, rail or over the road.

11. An apparatus according to claim 5 including a manifold system providing two independent outlets for supplying chemicals to a point of use, thereby significantly increasing the uptime of chemical supply.

* * * * *